United States Patent [19]
Pollmeier et al.

[11] 4,456,651
[45] Jun. 26, 1984

[54] TAPE-WOUND INSULATION SHEATH OR JACKET FOR AN ELECTRICAL CONDUCTOR

[75] Inventors: Franz-Josef Pollmeier; Walter Ihlein, both of Berlin, Fed. Rep. of Germany

[73] Assignee: Siemens Aktiengesellschaft, Berlin and Munich, Fed. Rep. of Germany

[21] Appl. No.: 362,879

[22] Filed: Mar. 29, 1982

[30] Foreign Application Priority Data

Apr. 6, 1981 [DE] Fed. Rep. of Germany ....... 3114420

[51] Int. Cl.³ .................. B32B 5/16; B32B 27/38; B05D 5/12; H02K 1/04
[52] U.S. Cl. .................... 428/324; 428/412; 428/454; 428/363; 428/428; 428/473.5; 428/430; 428/480; 428/906; 427/104
[58] Field of Search ............ 428/412, 473.5, 428, 428/454, 324, 906, 480, 430, 363

[56] References Cited

U.S. PATENT DOCUMENTS

| | | | |
|---|---|---|---|
| 3,458,389 | 7/1969 | Mertens | 428/324 |
| 4,046,938 | 9/1977 | Torossian et al. | 428/473.5 |
| 4,286,010 | 8/1981 | Staley et al. | 428/454 |
| 4,356,417 | 10/1982 | Smith et al. | 428/454 |

*Primary Examiner*—P. Ives
*Attorney, Agent, or Firm*—Karl F. Milde, Jr.; Andrew G. Rodau

[57] ABSTRACT

An improved insulating sheath for an electrical conductor, which is impregnated with a hardenable impregnating resin and afterwards hardened, has alternating layers of porous support and thermostable plastic foil support tapes of inorganic sheet type insulating material. The two tape multiple layered sheath gives increased dielectric strength and heat resistance without impairing resin impregnation capacity.

8 Claims, 2 Drawing Figures

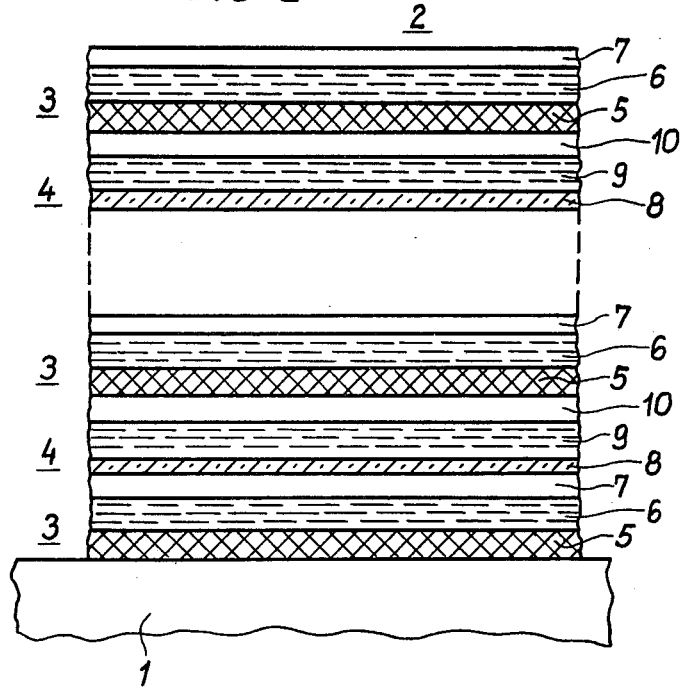
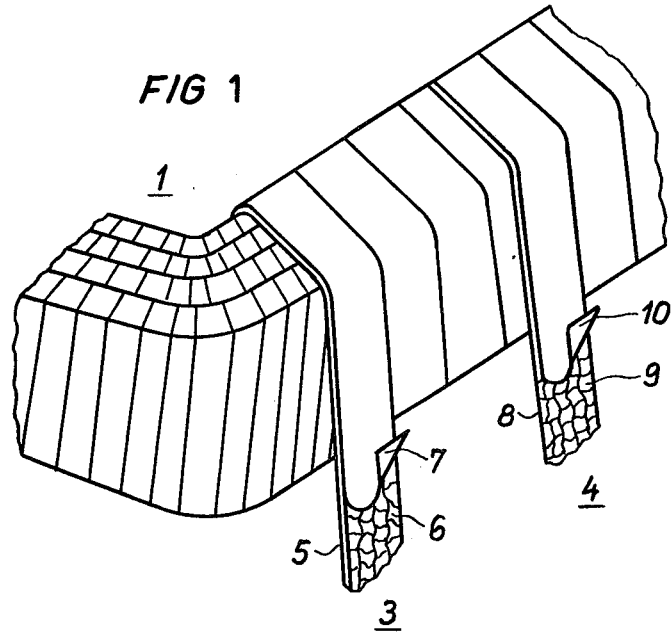

TAPE-WOUND INSULATION SHEATH OR JACKET FOR AN ELECTRICAL CONDUCTOR

BACKGROUND OF THE INVENTION

1. Field of the Invention

This invention relates to an improved tape-wound insulation sheath or jacket for an electrical conductor, such as the winding coil or bar of an electrical machine. This insulation sheath is impregnated with a hardenable impregnating resin and afterwards hardened. It is made up of several layers of tape comprising an inorganic, areal or sheet type insulating material, such as mica flakes, mica foils or mica paper, placed upon a flexible or pliable, porous support, which is bonded to said support or to itself or, if necessary, to a cover by a binder.

2. Description of the Prior Art

An example of a tape-wound insulating sheath of the type to which the present invention relates is described in German Pat. DE-PS No. 14 90 427 (to which U.S. Pat. No. 3,458,389 corresponds). Conventional sheaths of this type are wound from only one kind of mica tapes, i.e. mica tapes having one and the same support. To date, primarily porous supports such as paper, fiberglass, or nonwoven material, have been used in order to give a thorough impregnation of the sheath with the impregnating resin mixture.

The thickness of an insulating sheath depends on the permissible operating field strength. In addition, the short-time breakdown strength required by German and other specifications, of more than four times the nominal voltage, must be taken into consideration. In windings of electrical machines, however, a thinner insulation sheath would result in a better slot filling with copper, and the heat resistance between the conductor and the bundle of laminations would be reduced, whereby increased efficiency becomes possible.

SUMMARY OF THE INVENTION

It is an object of the invention to provide an improved impregnable, tape-wound insulation sheath for an electrical conductor or conductor assembly which has improved dielectric strength.

In accordance with one aspect of the invention, an improved insulation sheath has a single layer or multiple layers of plastic foil support tape superposed with a layer or layers of porous support tape.

Surprisingly, the impregnation capacity of the insulating sheath constructed of different tapes in this way is not impaired. This is so, because enough channels for the flow of the impregnating resin are still available in the layers adjacent to the plastic foil support tape layers. The use of intermediate layers of plastic foil support tapes, however, substantially increases the dielectric strength of the sheath both with respect to short-time voltage stress (short-time dielectric strength) during prescribed random tests and also with respect to long-term operation voltage stress. This improvement is especially marked in the case of thin insulation sheaths.

In contrast, attempts to obtain an increase in dielectric strength by wrapping electrically dense plastic foils into insulation sheaths wound from mica tapes with porous supports have been unsuccessful. But, the mixed tape insulation sheathing according to the invention provides increased dielectric strength that makes it possible to increase the operating field strength and accordingly to reduce the thickness of the insulation sheath; the lesser thickness of the plastic foil support as compared with a porous support being an additional favorable factor. Moreover, it is surprisingly found that an insulation sheath constructed according to the invention may also have higher heat resistance, i.e. that the insulation sheath may be exposed continuously to higher temperatures without any change in the rise of the loss factor (tan $\alpha$).

It is advantageous, as in the preferred embodiment described below, to evenly distribute the layers of plastic foil support tape between the layers of porous support tape, throughout the thickness of the insulation sheath. This results in a layered construction of the insulation sheath that is favorable for impregnation. The preferred ratio of plastic foil to porous layers is approximately 1:1.

If the insulation sheath is very thick, it is expedient to provide additional layers of absorbing material, such as irregular glass fiber, between the mica tape layers. These additional layers exert a wick effect to soak up the impregnating resin.

Especially suitable materials for the plastic foil support of the mica tapes are thermostable foils having a base chosen from among the polyimides, polycarbonates and polyesters, such as foils of terephthalic acid polyester. To facilitate bonding and for better incorporation of the plastic foil in the insulation, it is advantageous to activate the outer surfaces of the plastic foil support. This can be done by physical or chemical means or by means of a bonding aid in accordance with known techniques.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as a basis for the designing of other arrangements for carrying out the purposes of this invention. It is important, therefore, that this disclosure be regarded as including all such equivalent arrangements that encompass the spirit and scope of the invention.

BRIEF DESCRIPTION OF THE DRAWINGS

An embodiment of the invention has been chosen for the purposes of illustration and description, and is shown in the accompanying drawings forming a part of the specification, wherein:

FIG. 1 is a schematic view showing the construction of a tape-wound insulation sheath in accordance with the invention; and FIG. 2 is a cross-section view (greatly enlarged) of a portion of the composite layered tape-wound insulating sheath constructed as shown in FIG. 1.

Throughout the drawings, like elements are referred to by like numerals.

DESCRIPTION OF THE PREFERRED EMBODIMENT

An electrical conductor 1, which may be a winding bar or coil of an electrical machine, has an insulation sheath comprising a plurality of superposed layers of different composition mica tapes 3 and 4 which are wound alternatingly about the conductor 1, as shown in FIG. 1, to give the composite layered structure which is shown in FIG. 2. After winding, the sheathing is impregnated with an impregnating resin and hardened.

The first or bottom layer of the insulation sheath or jacket 2, which rests directly on the conductor 1, is formed by the mica tape 3. The tape 3 (see FIG. 2) consists of a support 5 of porous material, such as fiberglass, to which a layer 6 of mica laminae is applied by means of a suitable binder. Above the layer 6 is bonded a cover layer 7, again by means of a suitable binder. Advantageously, the cover layer 7 comprises the same material as the porous support 5, i.e. fiberglass.

The next layer of the insulation sheath 2 is formed by the mica tape 4. The tape 4 has a thermostable plastic foil support 8 comprising terephthalic acid polyester foil. To this is applied a laminated mica layer 9 by means of a suitable binder. Above the layer 9, is placed a cover layer 10, which may consist of a plastic foil material (which may be the same as the material of the support 8) or may consist of a suitable porous material.

The remainder of the insulation sheath 2 is then built up by alternating layers of the mica porous support tape 3 and layers of the mica plastic foil support tape 4 (as shown in FIG. 2). The topmost layer of the insulation sheath 2 is formed by the mica tape 3.

The insulation sheath 2 is preferably covered with an outer wrapping (not shown) which forms a cover or protective layer that may either itself act as external glow discharge protection, or may serve as a surface onto which external glow discharge protection can be applied after impregnation and hardening of the sheath 2.

Having thus described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto. It will be appreciated that the dimensions, shapes, materials and layout of the various elements of the described embodiment may be varied to suit individual tastes and requirements.

What is claimed is:

1. In a tape-wound insulation sheath or jacket for an electrical conductor, such as a winding coil or bar of an electrical machine, which is impregnated with a hardenable impregnating resin and hardened, made up of several layers of tape including an inorganic, areal or sheet type insulating material such as mica flakes, mica foils or mica paper placed upon a flexible or pliable porous support, which is binder bonded to said insulating material and to said support, said binder bonding said insulating material to one another and to said support, the improvement wherein in the insulating sheath, between the layers of tapes with a porous support, single or multiple layers of tapes with a plastic foil as support are arranged.

2. An improvement as defined in claim 1, comprising a plurality of layers of plastic foil support tape evenly distributed throughout the thickness of the insulation sheath relative to a plurality of layers of porous support tape.

3. An improvement as defined in claim 2, wherein the ration between the number of layers of plastic foil support tape and the number of layers of porous support tape is approximately 1:1.

4. An improvement as defined in claim 1, wherein the plastic foil support comprises a thermostable foil material and has a base chosen from the group consisting of polyimides, polycarbonates and polyesters.

5. An improvement as defined in claim 4, wherein the plastic foil support comprises a foil of terephthalic acid polyester.

6. An improvement as defined in claim 1 in an insulation sheath that is relatively thick, the improvement further comprising additional absorbent layers provided between the layers of tape having plastic foil support and tape having porous support.

7. An improvement as defined in claim 1, wherein the surfaces of the plastic foil support are activated.

8. In a tape-wound insulation sheath or jacket for an electrical conductor which includes a cover, such as a winding coil or bar of an electrical machine, which is impregnated with a hardenable impregnating resin and hardened, made up of several layers of tape including an inorganic, areal or sheet type insulating material such as mica flakes, mica foils or mica paper placed upon a flexible or pliable porous support, in which said insulating material, said support and said cover are binder bonded together, the improvement wherein in the insulating sheath, between the layers of tapes with a porous support, single or multiple layers of tapes with a plastic foil as support are arranged.

* * * * *